(12) United States Patent
Watanabe

(10) Patent No.: US 9,734,364 B2
(45) Date of Patent: Aug. 15, 2017

(54) RFID-TAG READING/WRITING METHOD AND READING/WRITING DEVICE

(71) Applicant: SATO HOLDINGS KABUSHIKI KAISHA, Tokyo (JP)

(72) Inventor: Atsushi Watanabe, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/032,734

(22) PCT Filed: Jul. 28, 2014

(86) PCT No.: PCT/JP2014/069840
§ 371 (c)(1),
(2) Date: Apr. 28, 2016

(87) PCT Pub. No.: WO2015/068435
PCT Pub. Date: May 14, 2015

(65) Prior Publication Data
US 2016/0283758 A1  Sep. 29, 2016

(30) Foreign Application Priority Data

Nov. 8, 2013 (JP) ................................. 2013-231692

(51) Int. Cl.
*G06K 7/10* (2006.01)

(52) U.S. Cl.
CPC ..... *G06K 7/10227* (2013.01); *G06K 7/10455* (2013.01)

(58) Field of Classification Search
CPC .......... G06K 7/10009; G06K 7/10366; G06K 19/0723; G06K 7/10198; G06K 19/0717;

(Continued)

(56) References Cited

U.S. PATENT DOCUMENTS 8,020,774 B2*  9/2011  Ohashi ................... B41J 3/4075
                                                    235/492
2005/0029350 A1*  2/2005  Jusas ........................ G06K 5/02
                                                    235/451

(Continued)

FOREIGN PATENT DOCUMENTS

JP    2004-082432 A    3/2004
JP    2005-135354 A    5/2005

(Continued)

*Primary Examiner* — Mark Blouin
(74) *Attorney, Agent, or Firm* — Foley & Lardner LLP

(57) ABSTRACT

An RFID-tag reading/writing method and reading/writing device improves processing efficiency of wireless data communication and of lowering an error rate of the reading/writing processing while a RFID tag 11 is being transferred are provided. Paying attention to the wireless data communication conducted with the RFID tag 11 along a plurality of device antennas provided on a transfer path 18 of the RFID tag 11, a reading/writing processing time is calculated based on a length of the device antenna faced with an RFID antenna 15 along a direction of the transfer path 18 and a transfer speed of the RFID tag 11 on the transfer path 18, and the wireless data communication is sequentially executed within the reading/writing processing time while the RFID tag 11 is being transferred between a first device antenna 19, a second device antenna 21 or a third device antenna 23 sequentially provided as device antennas on the transfer path 18 from the upstream side toward the downstream side and the RFID tags 11.

12 Claims, 4 Drawing Sheets

(58) Field of Classification Search
CPC .......... G06K 7/0008; G06K 7/10316; G06K 7/10227
USPC ..................................................... 340/10.51
See application file for complete search history.

(56) References Cited

U.S. PATENT DOCUMENTS

| | | |
|---|---|---|
| 2005/0077353 A1 | 4/2005 | Oishi et al. |
| 2005/0091821 A1* | 5/2005 | Best ................ G06K 19/07718 29/430 |
| 2006/0125640 A1* | 6/2006 | Oakes ...................... B65C 9/28 340/572.7 |
| 2007/0119932 A1 | 5/2007 | Sugano et al. |
| 2009/0033468 A1 | 2/2009 | Kato et al. |

FOREIGN PATENT DOCUMENTS

| | | |
|---|---|---|
| JP | 2007-156570 A | 6/2007 |
| JP | 2009-037452 A | 2/2009 |

* cited by examiner

RFID-TAG READING/WRITING METHOD AND READING/WRITING DEVICE

TECHNICAL FIELD

The present invention relates to an RFID-tag reading/writing method and reading/writing device and particularly to an RFID-tag reading/writing method and reading/writing device adapting an RFID (Radio Frequency Identification) technology.

BACKGROUND ART

Conventionally, an RFID tag having an IC chip and an RFID antenna and capable of wireless data communication is used in various management systems by executing reading processing and writing processing of various types of data with a device antenna in a reader/writer (RFID-tag reading/writing device).

In general, the RFID tag is used in a transfer stop reading/writing method in which the RFID tag is transferred on a transfer path as a band-shaped continuous body including a plurality of the RFID tags or a sheet-shaped member including the plurality of them and reading/writing processing (wireless data communication) of data is executed in a state in which the transfer is stopped once at a portion of the device antenna or in a transfer reading/writing method in which the reading/writing processing is executed during transfer.

However, on the transfer stop reading/writing method, transfer and stop of the RFID tag need to be performed intermittently, and there is a problem that drop of processing efficiency is inevitable.

Moreover, an RFID tag having failed the reading/writing processing cannot be proceeded to processing in the subsequent process (print processing, cutting processing and the like, for example), and drop of an error rate is also in demand.

PRIOR ART DOCUMENT(S)

Patent Literature 1: JP2009-37452A

SUMMARY OF INVENTION

Problems to be Solved

The present invention was made in view of the aforementioned problems and has an object to provide an RFID-tag reading/writing method and reading-writing device capable of improving processing efficiency of data reading/writing of the RFID tag.

Moreover, the present invention has an object to provide an RFID-tag reading/writing method and reading/writing device capable of improving processing efficiency of wireless data communication while the RFID tag is transferred.

Means for Solving the Problems

Moreover, the present invention has an object to provide an RFID-tag reading/writing method and reading/writing device capable of lowering an error rate of the reading/writing processing.

Solution to Problem

That is, the present invention pays an attention to wireless data communication with an RFID tag while the RFID tag is being transferred along a plurality of device antennas sequentially provided on a transfer path of the RFID tag and calculation of reading/writing processing time of the RFID tag, and a first invention is a reading/writing method of an RFID tag having an IC chip and an RFID antenna and capable of wireless data communication characterized in that the RFID tag is made transferable from an upstream side toward a downstream side along its transfer path, the reading/writing processing time is calculated from a length of the device antenna faced with the RFID antenna along a direction of this transfer path and a transfer speed of the RFID tag on this transfer path, and the wireless data communication is sequentially conducted between a first device antenna, a second device antenna or a third device antenna sequentially provided on the transfer path from the upstream side toward the downstream side and the RFID tag within the reading/writing processing time while the RFID tag is being transferred on the transfer path.

When the wireless data communication by the first device antenna with the RFID tag is not conducted properly and when a half of the reading/writing processing time has not elapsed since the start of the wireless data communication, reading processing from the RFID tag can be executed again between the first device antenna and the RFID tag.

When the wireless data communication by the first device antenna with the RFID tag is not conducted properly and when a half of the reading/writing processing time has elapsed since the start of the wireless data communication, the reading processing between the first device antenna and the RFID tag can be made a reading processing error.

When the wireless data communication by the first device antenna with the RFID tag is determined to be the reading processing error, a required number of the RFID tags to be processed can be subtracted by one.

When the wireless data communication by the second device antenna with the RFID tag is not conducted properly and when a half of the reading/writing processing time has not elapsed since the start of the wireless data communication, the data writing processing in the RFID tag can be executed again between the second device antenna and the RFID tag.

When the wireless data communication by the second device antenna with the RFID tag is not conducted properly and when a half of the reading/writing processing time has not elapsed since the start of the wireless data communication, the data writing processing in the RFID tag can be executed between the third device antenna and the RFID tag.

When the data writing processing in the RFID tag between the third device antenna and the RFID tag is determined to be the writing processing error, a required number of the RFID tags to be processed can be subtracted by one.

A second invention is a reading/writing device of an RFID tag having an IC chip and an RFID antenna and capable of wireless data communication characterized in that the RFID tag is made transferrable from an upstream side toward a downstream side along its transfer path, a first device antenna, a second device antenna, and a third device antenna are provided on this transfer path sequentially from the upstream side toward the downstream side, the reading/writing processing time is calculated from a length of each of these device antennas along a direction of the transfer path and a transfer speed of the RFID tag on the transfer path, and the wireless data communication is made executable sequentially between the first device antenna, the second device antenna or the third device antenna and the RFID tag within the reading/writing processing time while the RFID tag is being transferred on the transfer.

The first device antenna, the second device antenna, and the third device antenna can be configured capable of the wireless data communication with each of the RFID tags arrayed in plural rows on the transfer path.

An electric wave shielding plate may be provided in the peripheries of the first device antenna and the second device antenna, respectively.

The length of each of the first device antenna and the second device antenna along the direction of the transfer path can be a length exceeding at least a half of a tag length along the direction of the transfer path of the RFID tag.

Advantageous Effect

In the RFID-tag reading/writing method and reading/writing device according to the present invention, since the wireless data communication is sequentially conducted within the reading/writing processing time between the first device antenna, the second device antenna or the third device antenna sequentially provided on the transfer path of the RFID tag from the upstream side toward the downstream side and the RFID tag while the RFID tag is being transferred on the transfer path, a plurality of sessions of the data reading/writing processing is made executable for a single RFID tag, and processing efficiency can be improved and the error rate can be lowered.

Particularly according to the RFID-tag reading/writing method of the first invention, since the wireless data communication is sequentially executed between the first device antenna, the second device antenna or the third device antenna sequentially provided on the transfer path from the upstream side toward the downstream side and the RFID tag within the reading/writing processing time while the RFID tag is being transferred on the transfer path, a desired processing efficiency can be obtained and the error rate can be lowered by adjusting the transfer speed of the RFID tag on the transfer path.

Particularly according to the RFID-tag reading/writing device of the second invention, since the first device antenna, the second device antenna, and the third device antenna are sequentially provided on the transfer path of the RFID tag from the upstream side toward the downstream side, and the wireless data communication between the first device antenna, the second device antenna or the third device antenna and the RFID tag is sequentially made executable within the reading/writing processing time of the RFID tag, the reading/writing device capable of improving processing efficiency and lowering the error rate can be realized.

DESCRIPTION OF EMBODIMENTS

Since the present invention is configured such that wireless data communication is sequentially conducted between a first device antenna, a second device antenna or a third device antenna on a transfer path from an upstream side toward a downward stream side and an RFID tag within reading/writing processing time while the RFID tag is being transferred on the transfer path, an RFID-tag reading/writing method and reading/writing device capable of improving processing efficiency and of lowering an error rate is realized.

Embodiment

Subsequently, the RFID-tag reading/writing method and reading/writing device according to an embodiment of the present invention will be described on the basis of FIGS. 1 to 6.

Figure 1:
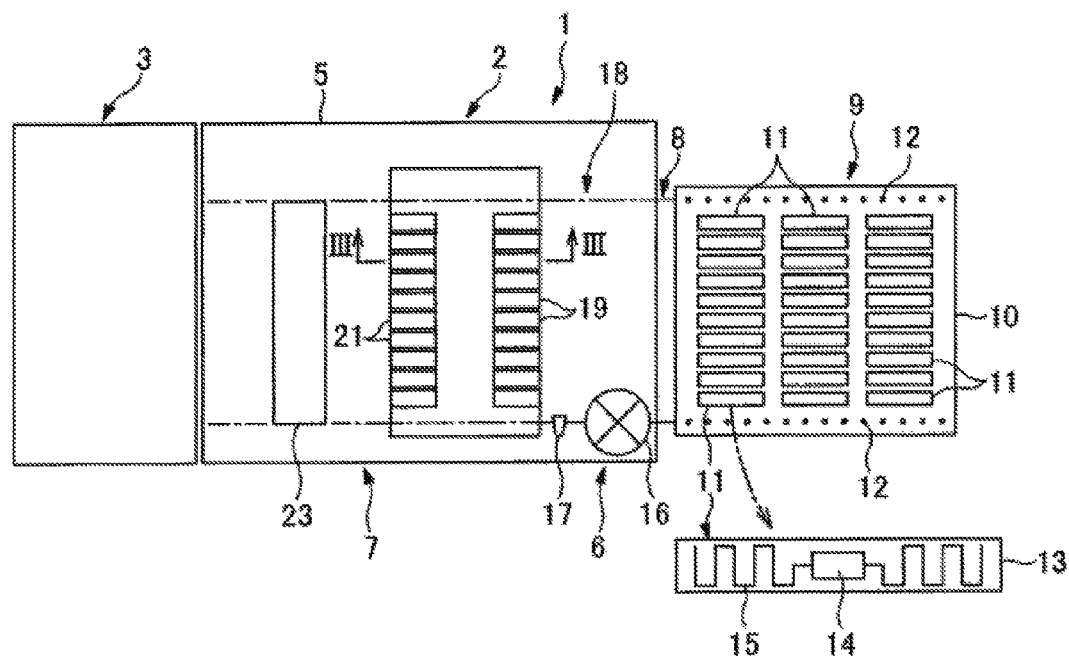
FIG. 1 is a schematic plan view of an RFID-tag reading/writing printing device 1 including an RFID-tag reading/writing device 2 according to an embodiment of the present invention.
Figure 2:
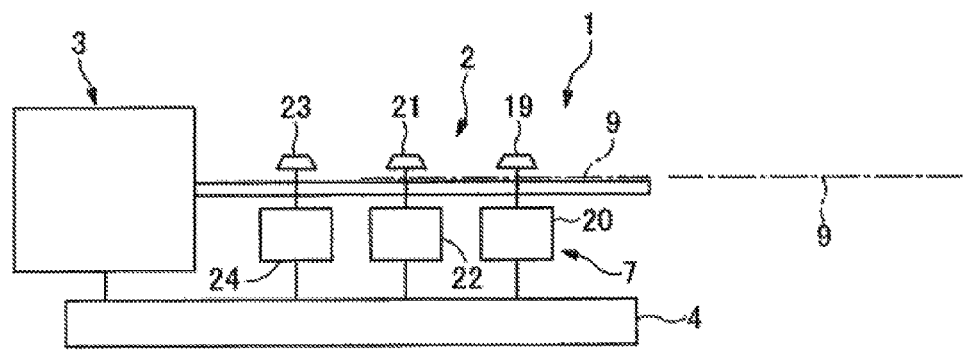
FIG. 2 is a schematic side view of the RFID-tag reading/writing printing device 1 of the above.

FIG. 1 is a schematic plan view of an RFID-tag reading/writing printing device 1 and FIG. 2 is a schematic side view of the RFID-tag reading/writing printing device 1, and the RFID-tag reading/writing printing device 1 has an RFID-tag reading/writing device 2, a printing device 3, and a control section 4 (FIG. 2) according to the embodiment.

The RFID-tag reading/writing device 2 has a device housing 5, a transfer section 6, and a data reading/writing section 7.

From a supply port 8 of the device housing 5, a sheet-shaped RFID tag continuous body 9, for example, can be supplied into the RFID-tag reading/writing printing device 1 (RFID-tag reading/writing device 2).

In the RFID tag continuous body 9, a plurality of (lateral 10 rows and vertical 3 lines of tags, that is, 30 tags in total in an example illustrated in FIG. 1) RFID tags 11 is temporarily attached to a sheet body 10, transfer holes 12 are formed in both right and left edge parts of the sheet body 10 at a predetermined pitch, respectively, and a position detection mark (not shown) is printed in advance on its back surface side.

The RFID tag 11 has, as its plan view illustrated in an enlarged manner in a part of FIG. 1, an IC chip 14 provided substantially at a center position on a tag film 13 and an RFID antenna 15 formed having a die pole type using a UHF band (300 MHz to 3 GHz), for example, on the IC chip 14, and wireless data communication (data reading/writing processing) is made possible with a data reading/writing section 7.

Regarding the RFID tag continuous body 9, the sheet body 10 may be formed from a band-shaped material and supplied in constitution of a generally band shape.

The transfer section 6 has a tag encoder 16 and a tag sensor 17 and is capable of transferring the RFID tag 11 from an upstream side (the supply port 8 side) toward a downstream side (the printing device 3 side) along its transfer path 18.

That is, the tag encoder 16 has a gear (not shown) engaged with the transfer hole 12 of the RFID tag continuous body 9 and measures a transfer distance of the RFID tag continuous body 9 by counting a rotation number of its driving motor (not shown) and the tag sensor 17 detects the position detection mark on the back surface side of the RFID tag continuous body 9 so that a relative position of the RFID tag continuous body 9 (RFID tag 11) to the RFID-tag reading/writing device 2 and the printing device 3 is detected.

The data reading/writing section 7 has a first device antenna 19 and a first reader/writer 20, a second device antenna 21 and a second reader/writer 22, and moreover, a third device antenna 23 and a third reader/writer 24 sequentially provided as device antennas on the transfer path 18 from the upstream side toward the downstream side and has the first reader/writer 20, the second reader/writer 22, and the third reader/writer 24 connected to the control section 4.

The first device antenna 19 and the second device antenna 21 are arrayed in number of 10 in a width direction of the RFID tag continuous body 9 in accordance with the rows (lateral 10 rows) of the RFID tags 11 in the RFID tag continuous body 9, respectively, and wireless data communication is possible with the RFID tags 11 arrayed in a plural rows (lateral 10 rows) on the transfer path 18.

The third device antenna 23 is a single antenna capable of facing all the RFID tags 11 in the lateral 10 rows over the width direction of the RFID tag continuous body 9 and is capable of wireless data communication with the respective RFID tags 11.

Figure 3:
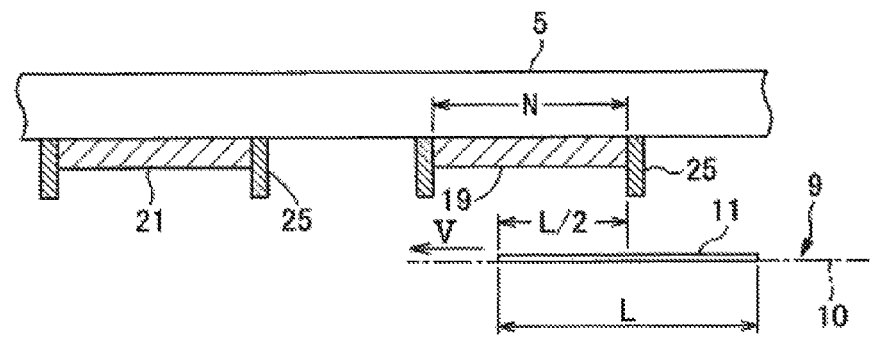
FIG. 3 is a III-III line enlarged sectional view of FIG. 1 of the above.

FIG. 3 is a III-III line enlarged sectional view of FIG. 1, and electric wave shielding plates 25 are provided around the first device antenna 19 and the second device antenna 21, respectively.

The electric wave shielding plate 25 is a plate made of iron, for example, and can limit communication regions of the first device antenna 19 and the second device antenna 21 arranged in a multi-row state within this range, respectively. Therefore, data reading processing and writing processing via radio can be executed with desired efficiency while the constitution in which a large number of the RFID tags 11 are arrayed as in the RFID tag continuous body 9 is being transferred.

Each of the first device antenna 19 and the second device antenna 21 as described above has a device antenna length N along a direction of the transfer path 18, respectively, and this device antenna length N preferably has a length exceeding at least a half (L/2) of its tag length L along the direction of the transfer path 18 of the RFID tag 11 (more accurately, an antenna length along the direction of the transfer path 18 of the tag antenna 15).

That is, when it is L/2<N, the first device antenna 19 and the second device antenna 21 are faced with at least a half of a region of the tag antenna 15 of the RFID tag 11 when the RFID tag 11 is transferred to the respective regions so that wireless data communication is made possible.

From each of the device antenna length N along the direction of the transfer path 18 of the device antenna (first device antenna 19 and the second device antenna 21) facing the RFID antenna 15 and a transfer speed V of the RFID tag 11 on the transfer path 18, communicable time of the data reading processing and writing processing, that is, the respective reading/writing processing time T can be calculated.

Generally, the reading/writing processing time T=N/V in approximate. The reading/writing processing time T can be also determined while the RFID tag continuous body 9 is moved by a predetermined pitch toward the data reading/writing section 7.

The printing device 3 is capable of printing predetermined required information according to the respective RFID tags 11 on print surfaces of the respective the RFID tags 11 for which the data reading/writing processing is completed in the data reading/writing section 7 in an arbitrary print method. It is needless to say that subsequent use can be avoided by applying "error" display on the RFID tag 11 (error tag) in which an error occurred in the reading/writing processing.

The control section 4 controls the RFID-tag reading/writing device 2 and the printing device 3 at predetermined timing, manages a required number of RFID tags to be processed in the RFID-tag reading/writing device 2 and the printing device 3 and individually recognizes/stores the RFID tag 11 for which the data reading/writing processing is properly completed in the data reading/writing section 7 and the RFID tag 11 in which the reading/writing processing failed and their numbers.

A reading/writing method of the RFID tag 11 in the RFID-tag reading/writing printing device 1 with the constitution as above or particularly by the RFID-tag reading/writing device 2 of the present invention will be described on the basis of FIGS. 4 to 6.

Figure 4:
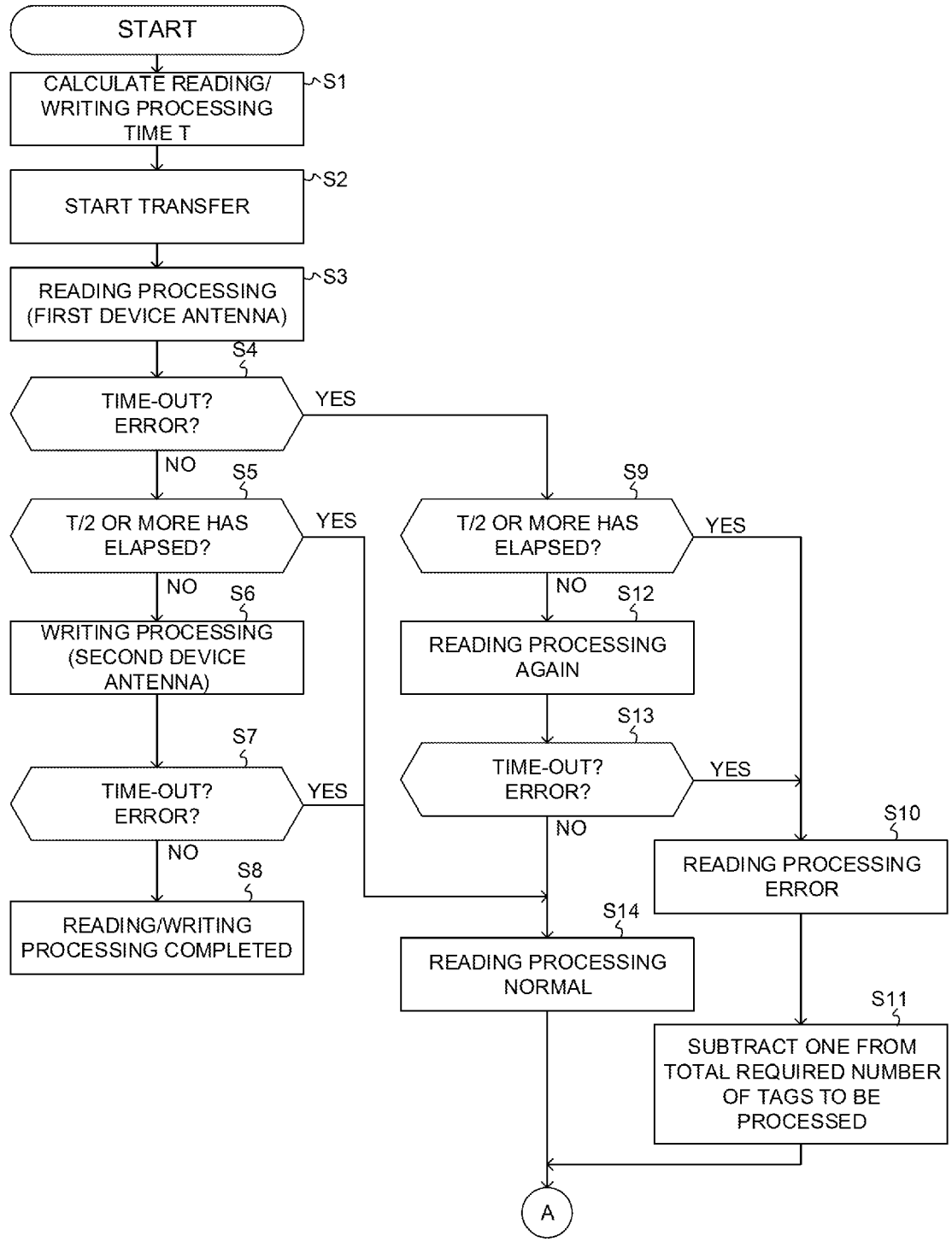
FIG. 4 is a flowchart of a reading/writing method of an RFID tag 11 according to the RFID-tag reading/writing device 2 and is a flowchart mainly of reading processing by a first device antenna 19 of the above.
Figure 5:
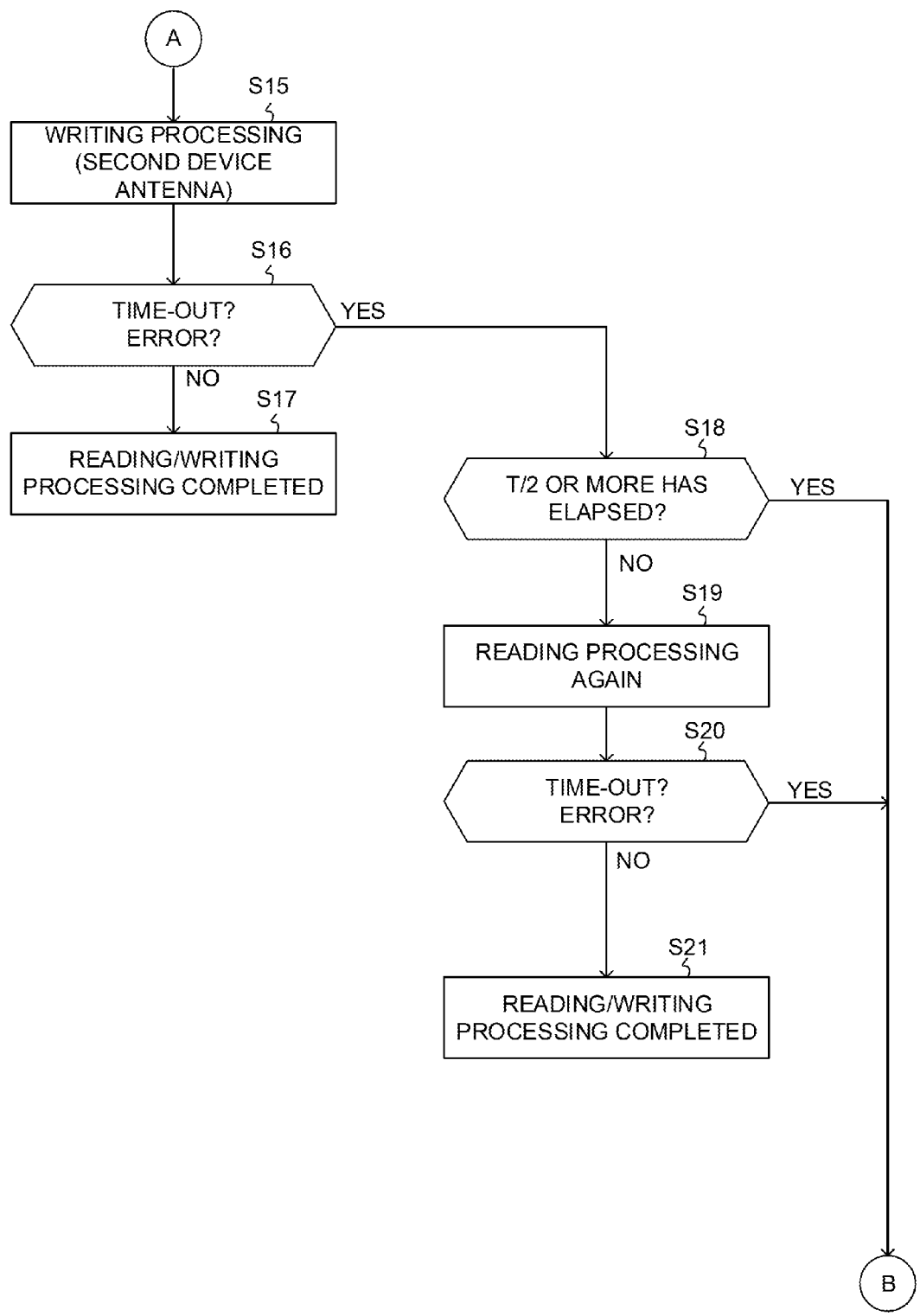
FIG. 5 is a flowchart of the reading/writing method of the RFID tag 11 according to the RFID-tag reading/writing device 2 and is a flowchart mainly of writing processing by a second device antenna 21 of the above.
Figure 6:
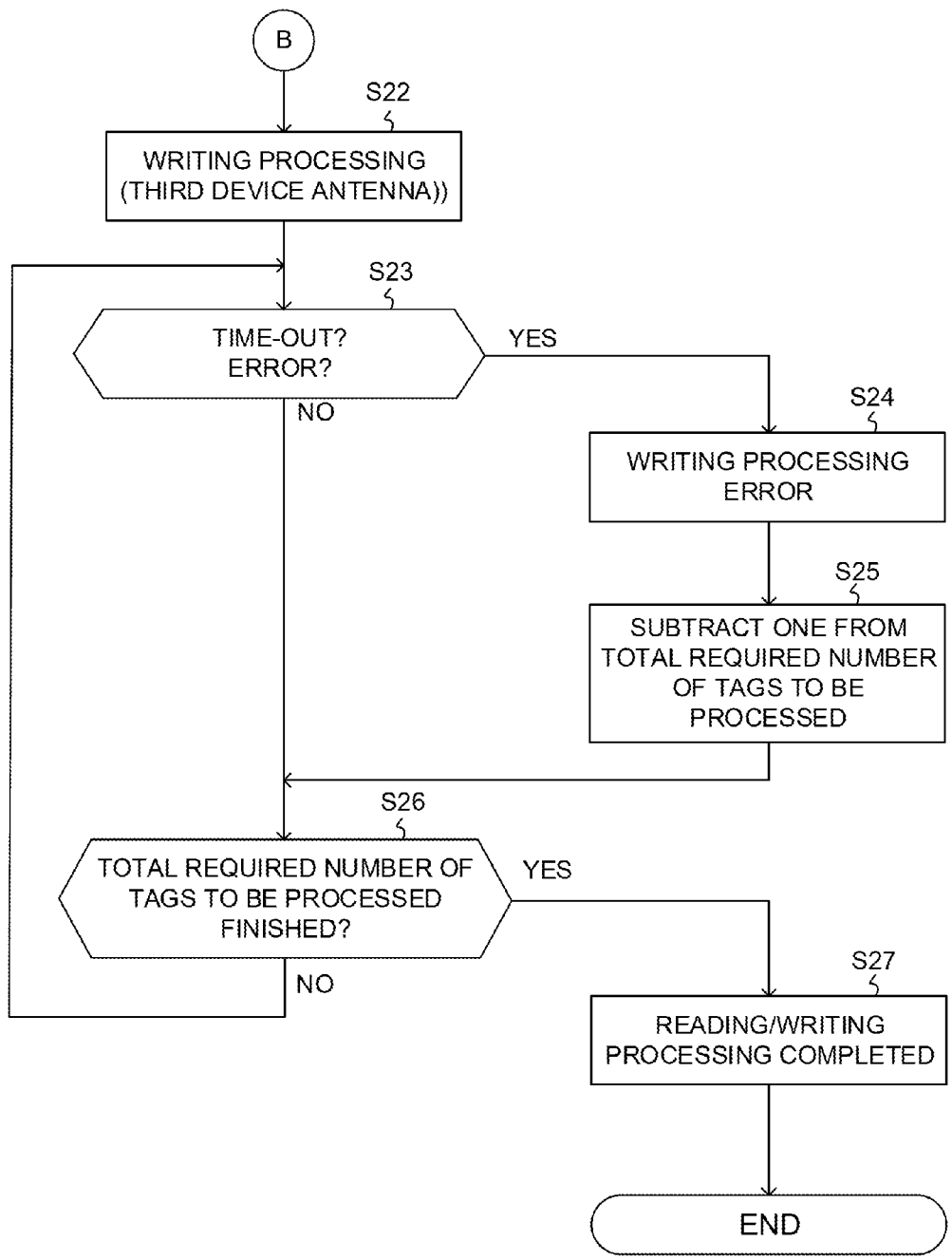
FIG. 6 is a flowchart of a reading/writing method of the RFID tag 11 according to the RFID-tag reading/writing device 2 and is a flowchart mainly of writing processing by a third device antenna 23 of the above.

FIGS. 4 to 6 are flowcharts of the reading/writing method of the RFID-tag 11 by the RFID-tag reading/writing device 2, in which FIG. 4 is a flowchart of the reading processing mainly by the first device antenna 19, FIG. 5 is a flowchart of the writing processing mainly by the second device antenna 21, and FIG. 6 is a flowchart of the writing processing mainly by the third device antenna 23.

As illustrated in FIG. 4, at Step S1, the reading/writing processing time T of the first device antenna 19 and the second device antenna 21 is calculated, respectively.

At Step S2, the RFID tag continuous body 9 is supplied to the supply port 8, and transfer in the RFID-tag reading/writing printing device 1 (the RFID-tag reading/writing device 2) is started by the transfer section 6.

At Step S3, the reading processing of the RFID tag 11 by the first device antenna 19 is executed. This reading processing is generally to individually recognize the respective RFID tags 11 by reading their identification numbers written in advance in the RFID tags 11.

At Step S4, it is determined whether or not this reading processing is time-out or an error.

The "time-out" in the reading processing is a case in which no reply is made from the RFID tag 11 within normal predetermined range time set in combination of the first device antenna 19 and the RFID antenna 15 (RFID tag 11).

The "error" in the reading processing is a case in which contents of a reply from the RFID antenna 15 to a query from the first device antenna 19 to the RFID tag 11 cannot be recognized or is apparently a wrong answer as the identification number.

The "time-out" in the writing processing which will be described later is a case in which there is no such reply that writing from the RFID tag 11 is normally performed within the normal predetermined range time to a writing instruction to the RFID 11 by the first device antenna 19, the second device antenna 21 or the third device antenna 23.

Moreover, the "error" in the writing processing is a case in which the writing processing in the RFID 11 by the first device antenna 19, the second device antenna 21 or the third device antenna 23 is not normally executed.

At Step S4, when it is neither time-out nor an error, at Step S5, it is determined whether or not a half or more of the reading/writing processing time T has elapsed since the start of the reading processing by the first device antenna 19.

When the time has not elapsed, at Step S6, the writing processing which is the subsequent processing to the RFID tag 11 is executed by the first device antenna 19 and at Step S7, it is determined whether or not it is time-out or an error and when it is not time-out or an error, at Step S8, it is determined that the reading/writing processing of the RFID tag 11 is both completed (processing of the RFID tag 11 is completed).

At Step S4, when it is time-out or an error, it is determined at Step S9 whether or not a half or more of the reading/writing processing time T has elapsed, and when the time has elapsed, it is determined at Step S10 that the reading processing is an error, that is, the RFID tag 11 is an error tag.

Moreover, at Step S11, one is subtracted from the total required number of RFID tags 11 to be processed in the RFID tag continuous body 9. That is, when the wireless data communication by the first device antenna 19 with the RFID tag 11 is determined to be a reading processing error in the end, one is subtracted from the required number of the RFID tags 11 to be processed.

At the aforementioned Step S9, when a half or more of the reading/writing processing time T has not elapsed, at Step S12, the reading processing by the first device antenna 19 is executed again. That is, when the wireless data communication by the first device antenna 19 with the RFID tag 11 is not properly conducted and when a half of the reading/writing processing time T has not elapsed since the start of the wireless data communication, the reading processing from the RFID tag 11 is executed again between the first device antenna 19 and the RFID tag 11.

At the subsequent Step S13, it is determined that the aforementioned second reading processing is time-out or an error and in the case of time-out or an error, the routine proceeds to Step S10. That is, when the wireless data communication by the first device antenna 19 with the RFID tag 11 is not properly conducted and when a half of the reading/writing processing time T has elapsed since the start of the wireless data communication, the reading processing between the first device antenna 19 and the RFID tag 11 is determined to be the reading processing error.

When the second reading processing at Step S13 is not time-out or an error, at Step S14, the reading processing from this RFID tag 11 is determined to be normal, and the writing processing of the necessary data in the RFID tag 11 is executed in the subsequent Step S15 (FIG. 5).

When a half or more of the reading/writing processing time T has elapsed at Step S5 and in the case of time-out or an error at Step S7, the routine proceeds to Step S14.

Moreover, after subtraction processing of one tag from the required number of tags to be processed at Step S11, too, the routine proceeds to Step S15 (FIG. 5).

Subsequently, at Step S15 in FIG. 5, the writing processing by the second device antenna 21 is started, it is determined at Step S16 whether or not it is time-out or an error, and when it is not time-out or an error, that is, when the writing processing is normal, at Step S17, it is determined that the reading/writing processing of the RFID tag 11 is both completed (processing of the RFID tag 11 is completed).

When it is time-out or an error at Step S16, at Step S18, it is determined whether or not a half or more of the reading/writing processing time T has elapsed since the start of the writing processing by the second device antenna 21.

When the time has not elapsed, at Step S19, the writing processing by the second device antenna 21 is executed again. That is, when the wireless data communication by the second device antenna 21 with the RFID tag 11 is not properly conducted and when a half of the reading/writing processing time T has not elapsed since the start of the wireless data communication, the data writing processing in the RFID tag 11 is executed again between the second device antenna 21 and the RFID tag 11.

At the subsequent Step S20, it is determined whether or not the second writing processing is time-out or an error, and when it is not time-out or an error, it is determined at Step S21 that the reading/writing processing is normal and the processing of the RFID tag 11 is completed, while when it is time-out or an error, the routine proceeds to the subsequent Step S22 (FIG. 6).

When a half or more of the reading/writing processing time T by the second device antenna 21 has elapsed at Step S18, too, the routine proceeds to Step S22.

Subsequently, at Step S22 in FIG. 6, the writing processing of the data in the RFID tag 11 by the third device antenna 23 is started. That is, when the wireless data communication by the second device antenna 21 with the RFID tag 11 is not properly conducted and when a half of the reading/writing processing time T has elapsed since the start of the wireless data communication, the data writing processing in the RFID tag 11 is executed between the third device antenna 23 and the RFID tag 11.

However, regarding the RFID tag 11 processed by a portion of this third device antenna 23, its identification number has been already read normally, and as described above, the third device antenna 23 can be faced with all the RFID tags 11 in the plural rows (lateral 10 rows in the example illustrated in FIG. 1) over the width direction of the RFID tag continuous body 9, and the wireless data communication can be conducted sequentially with the respective RFID tags 11.

At Step S23, it is determined whether or not the writing processing is time-out or an error, and if it is time-out or an error, it is finally determined at Step S24 that it is a writing processing error, that is, the RFID tag 11 is an error tag, one is subtracted from the total required number of RFID tags 11 to be processed in the RFID tag continuous body 9 at Step S25, and the routine proceeds to Step S26. That is, when the data writing processing in the RFID tag 11 between the third device antenna 23 and the RFID tag 11 is determined to be a writing processing error, one is subtracted from the required number of RFID tags 11 to be processed.

At Step S26, it is determined whether or not the total required number of RFID tags 11 to be processed (number of written tags) have been all finished, and if not, the routine returns to Step S22, and the writing processing is repeatedly executed for the remaining RFID tags 11 in the total required number of the RFID tags 11 to be processed.

If the total required number of tags to be processed has been all finished at Step S26, at Step S27, it is determined that the reading/writing processing of the RFID tag 11 has been completed.

As described above, the wireless data communication processing in the RFID-tag reading/writing device 2 is completed, the RFID tag continuous body 9 is transferred/supplied into the printing device 3, and predetermined information is printed/displayed on the print surface of the RFID tag 11 for which the data reading processing and writing processing have been properly completed.

As described above, according to the present invention, it is so configured that the wireless data communication is sequentially conducted between the first device antenna 19, the second device antenna 21 or the third device antenna 23 provided as the device antennas sequentially on the transfer path 18 from the upstream side toward the downstream side and the RFID tag 11 within the reading/writing processing time T while the RFID tag 11 is being transferred on the transfer path 18 and thus, the wireless data communication with the RFID tag 11 can be executed in a state in which an error tag can be appropriately excluded and outflow of the error tag can be prevented, and the predetermined processing speed or processing efficiency is improved.

In the present invention, as an electric wave frequency band to be used for the RFID tag 11, through appropriate selection of the IC chip 14 and the tag antenna 15, an arbitrary frequency band such as a micro wave (1 to 30 GHz), an HF band (3 MHz to 30 MHz) or 135 kHz or less can be used other than the UHF band (300 MHz to 3 GHz), and the reading processing and the writing processing (data communication) of the data required for the IC chip 14 can be executed wirelessly via the RFID antenna 15.

REFERENCE SIGNS LIST

1 RFID-tag reading/writing printing device (FIG. 1)
2 RFID-tag reading/writing device (embodiment, FIGS. 1 and 2)
3 printing device
4 control section
5 device housing
6 transfer section
7 data reading/writing section
8 supply port
9 RFID tag continuous body
10 sheet body
11 RFID tag
12 transfer hole
13 tag film
14 IC chip
15 RFID antenna
16 tag encoder
17 tag sensor
18 transfer path
19 first device antenna
20 first reader/writer
21 second device antenna
22 second reader/writer
23 third device antenna
24 third reader/writer
25 electric wave shielding plate (FIG. 3)
N device antenna length (L/2<N, FIG. 3)
L tag length of RFID tag 11
V transfer speed of RFID tag 11
T reading/writing processing time of RFID tag 11 (T≈N/V)

The invention claimed is:

1. An RFID-tag reading/writing method of an RFID tag, having an IC chip and an RFID antenna, capable of wireless data communication, comprising:
    transferring the RFID tag along a transfer path from an upstream side toward a downstream side;
    calculating a reading/writing processing time based on a length of a device antenna faced with the RFID antenna along a direction of the transfer path and a transfer speed of the RFID tag in the transfer path; and
    sequentially conducting the wireless data communication between a first device antenna, a second device antenna or a third device antenna sequentially provided as the device antenna on the transfer path from the upstream side toward the downstream side and the RFID tag within the reading/writing processing time while the RFID tag is being transferred on the transfer path.

2. The RFID-tag reading/writing method according to claim 1, wherein
    when the wireless data communication by the first device antenna with the RFID tag is not conducted properly and when a half of the reading/writing processing time has not elapsed since the start of the wireless data communication, reading processing from the RFID tag is executed again between the first device antenna and the RFID tag.

3. The RFID-tag reading/writing method according to claim 1, wherein
    when the wireless data communication by the first device antenna with the RFID tag is not conducted properly and when a half of the reading/writing processing time has elapsed since the start of the wireless data communication, the reading processing between the first device antenna and the RFID tag is determined to be a reading processing error.

4. The RFID-tag reading/writing method according to claim 3, wherein
    when the wireless data communication by the first device antenna with the RFID tag is determined to be the reading processing error, a required number of the RFID tags to be processed is subtracted by one.

5. The RFID-tag reading/writing method according to claim 1, wherein
    when the wireless data communication by the second device antenna with the RFID tag is not conducted properly and when a half of the reading/writing processing time has not elapsed since the start of the wireless data communication, the data writing processing in the RFID tag is executed again between the second device antenna and the RFID tag.

6. The RFID-tag reading/writing method according to claim 1, wherein
    when the wireless data communication by the second device antenna with the RFID tag is not conducted properly and when a half of the reading/writing processing time has elapsed since the start of the wireless data communication, the data writing processing in the RFID tag is executed between the third device antenna and the RFID tag.

7. The RFID-tag reading/writing method according to claim 1, wherein
    when the data writing processing in the RFID tag between the third device antenna and the RFID tag is determined to be a writing processing error, a required number of the RFID tags to be processed is subtracted by one.

8. An RFID-tag reading/writing device of an RFID tag, having an IC chip and an RFID antenna, capable of wireless data communication, wherein
    the RFID tag is transferred along a transfer path from an upstream side toward a downstream side;
    a first device antenna, a second device antenna, and a third device antenna are provided on the transfer path sequentially from the upstream side toward the downstream side;
    the reading/writing processing time is calculated based on a length of each of these device antennas along a direction of the transfer path and a transfer speed of the RFID tag on the transfer path; and
    the wireless data communication is executed sequentially within the reading/writing processing time while the RFID tag is being transferred on the transfer path between the first device antenna, the second device antenna or the third device antenna and the RFID tag.

9. The RFID-tag reading/writing device according to claim 8, wherein
the first device antenna, the second device antenna, and the third device antenna performs the wireless data communication with each of the RFID tags arrayed in plural rows on the transfer path.

10. The RFID-tag reading/writing device according to claim 8, wherein
an electric wave shielding plate is provided in the peripheries of the first device antenna and/or the second device antenna, respectively.

11. The RFID-tag reading/writing device according to claim 8, wherein
the length of each of the first device antenna and the second device antenna along the direction of the transfer path is at least longer than a half of a tag length along the direction of the transfer path of the RFID tag.

12. An RFID-tag reading/writing device of an RFID tag, having an IC chip and an RFID antenna, capable of wireless data communication, wherein
the device is configured to transfer the RFID tag along a transfer path thereof from an upstream side toward a downstream side;
a first device antenna, a second device antenna, and a third device antenna are provided on the transfer path sequentially from the upstream side toward the downstream side;
a reading/writing processing time is calculated based on lengths of these device antennas along a direction of the transfer path and a transfer speed of the RFID tag on the transfer path; and
the wireless data communication is executed sequentially within the reading/writing processing time while the RFID tag is being transferred on the transfer path between the first device antenna, the second device antenna or the third device antenna and the RFID tag, an error RFID tag that is determined to be a writing processing error is appropriately excluded so that outflow of the error RFID tag is prevented, and the wireless data communication with the RFID tag is executed in a state that a processing speed and/or a processing efficiency is improved.

* * * * *